April 3, 1934.  N. W. LYON  1,953,182
OVERLOAD RELEASE MECHANISM
Filed Sept. 19, 1932
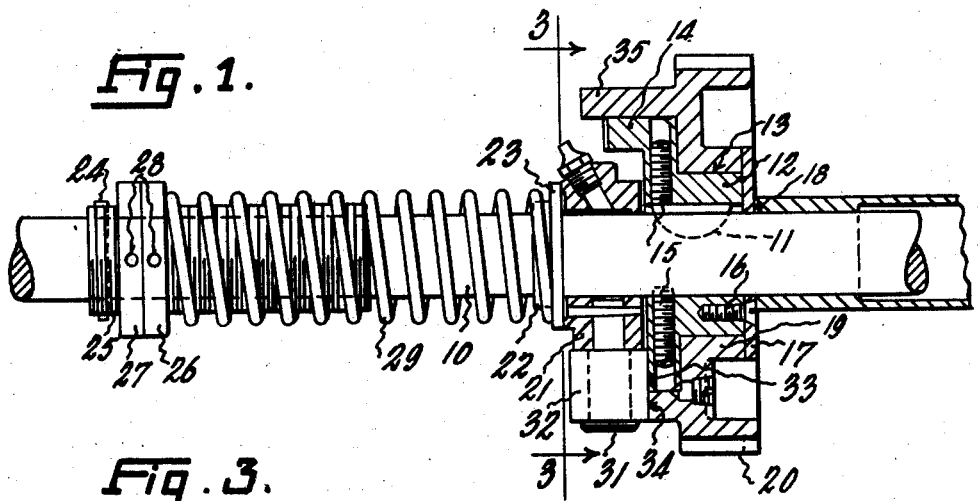
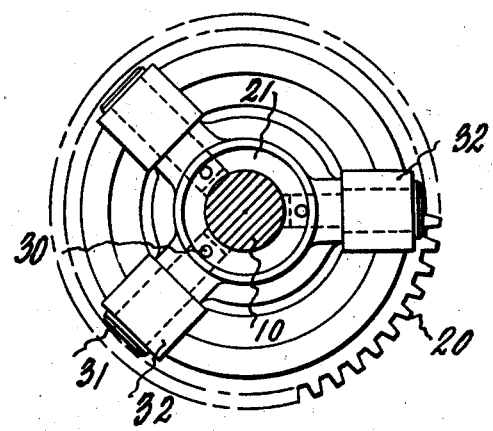
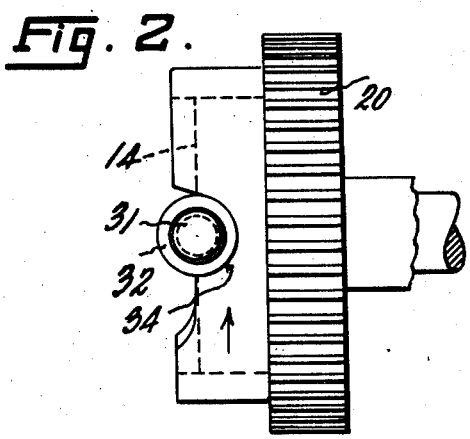
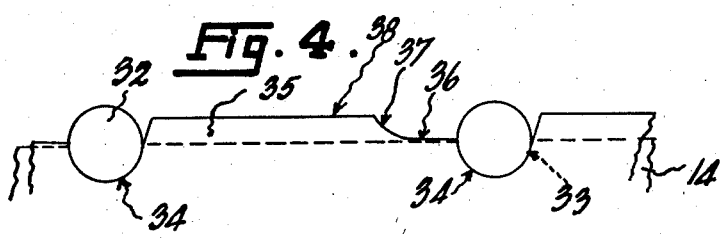
INVENTOR
NORMAN W. LYON
BY
ATTORNEYS Patented Apr. 3, 1934

1,953,182

UNITED STATES PATENT OFFICE 1,953,182

OVERLOAD RELEASE MECHANISM

Norman W. Lyon, Springfield, Mass., assignor to National Bread Wrapping Machine Company, Springfield, Mass., a corporation of Massachusetts Application September 19, 1932, Serial No. 633,834

5 Claims. (Cl. 192—56)

This invention relates to a mechanism for coupling the driving and driven parts of a machine together in such a manner that they will become disconnected automatically when the driven member is subjected to a load greater than a predetermined maximum. Mechanisms of this general type have hitherto been unsatisfactory in several respects, and it is the object of my invention to improve upon these prior mechanisms so that these unsatisfactory features will be avoided. One specific object of the invention is to provide an overload release mechanism which is simple in construction and which will require a minimum of space. A further object is to provide an overload release mechanism in which the disconnection of the driving and driven parts will be complete and yet in which the parts can be reset manually without the necessity of direct access to the release mechanism. A further object is to provide a release mechanism in which separation of the driving parts becomes progressively easier after they have once started to separate, whereby the disconnection of the parts is made especially positive and rapid. A further object is to provide a release mechanism which can be re-engaged only with the parts in predetermined timed relation. A further object is to provide a release mechanism which will be capable of gradual and accurate adjustment, so that a slight increase in the load beyond that which is normal for the machine being driven will be sufficient to move the clutch parts into their inoperative position. A further object is to provide a driving connection between the driving and driven members which will be substantially direct and which will avoid the strains where power is transmitted through several intermediate members. Additional objects will appear from the following description and claims.

Referring to the drawing,

Figure 1 is a central longitudinal section through an overload release mechanism embodying the invention;

Fig. 2 is a side elevation of a portion thereof;

Fig. 3 is a section on line 3—3 of Fig. 1; and

Fig. 4 is a development of a portion of the clutch members.

The overload release mechanism is carried by a shaft 10 which in the example shown constitutes the driven part of the machine. Keyed to this shaft as at 11 is an inner clutch member 12 having an outer bearing surface 13 and an axially extending flange 14. Set screws 15 are shown as assisting the key 11 in maintaining the inner clutch member rigidly attached to the shaft. Secured to the member 12 by screws 16 is a collar 17 resting against a shoulder 18 on the shaft and projecting beyond the bearing surface 13 in a radial direction. An outer clutch member 19 rotates freely in the bearing formed by surface 13, collar 17, and the inner side of flange 14. This shoulder may be formed directly on the shaft, or for ease in assembly may be formed by a sleeve secured to the shaft in any desired way. In the example shown this outer clutch member is provided with gear teeth 20 so that it may be connected to a power source and serve as the driving part of the clutch.

Freely rotatable and slidable on the shaft 10 is the hub of a spider 21. A collar 22 having a radial flange 23 is likewise freely mounted on the shaft. Spaced from this collar, and secured to the shaft as by a pin 24 and a suitable key (not shown), is an externally threaded sleeve 25 having two collars 26, 27, screwed thereon and adjustable in position by spanner holes 28. Collar 26 serves as an abutment for one end of a helical compression spring 29, the other end of which encircles the body of the collar 22 and bears against its radial flange, while collar 27 acts as a locknut. The spider 21 has pinned to it at 30 (Fig. 3) a series of radial, headed studs 31, preferably unequally spaced around the circumference. Upon each of these studs a roller 32 is freely rotatable.

These rollers form the operative connection between the inner and outer clutch members, normally resting in alined circular grooves 33 and 34 in the two members. In the inner member 12 these grooves are approximately half the diameter of the rollers, and the remainder of the end of the flange 14 is flat. The axial flange 35 on the outer clutch member extends beyond the flange 14 and the grooves 34 are deeper. The grooves 34 at their bottoms follow the contour of the rolls, and on one side slope gradually away from their semi-circular bottom portions. On the opposiste side each groove follows the contour of the roll closely to a point approximately on a line with the roll's center but just beyond the flat edge of the flange 14. Here the contour of the flange 35 abruptly changes to a flat land 36 preferably of a length having the same order of magnitude as the roll 32. The flange is again extended at the end of the land 36, a stop curve 37 joining the land 36 with a second land 38. It will be understood that this configuration of the flanges 14 and 35 is repeated at intervals corresponding to the three rolls 32.

In operation the spring 29 holds the rolls 32 in their grooves 33, 34, as long as the load on the driven member (in this case the member 12) does not exceed that for which the release mechanism is set. Power is transmitted from the driving member 19 to the driven member 12 through the rolls 32, the construction shown having the advantage that no substantial load is imposed upon the pivot pins 31. If the load on the driven member 12 becomes too great the member will be retarded relative to the member 19 and the rolls will be subjected to pressure on their opposite sides, tending to force them outwardly against the pressure of spring 29. The leverage tending to force the rolls outwardly increases rapidly as the shoulders of the grooves pass under the rounded contour of the rolls, while the force tending to drive member 12 also decreases rapidly for the same reason. A very quick motion of the rolls is thus secured, bringing them rapidly onto the lands 36 where they rest upon the stop shoulders 37. In this position they are entirely clear of the driven member 12, since the lands 36 project beyond the flange 14. The driving and driven members are now entirely disconnected and the former revolves freely, carrying the spider 21 with it. When it is desired to reset the mechanism the power drive is stopped and the driven machine is rotated backward by hand until the rolls again drop into the grooves. It will be noticed that while there are three rolls it is impossible to cause the mechanism to become re-engaged except in a single relative angular position, since the rolls and grooves are unevenly spaced. Due to the axial position of the spring 29 it can be made much longer than a spring of equivalent strength placed in the radial direction common in most devices of this general character. This increased length is of importance in giving greater sensitivity to the adjustment 26, 27.

While I have described the invention in the specific form which I at present prefer it will be understood that changes in the detailed embodiment may be made by those skilled in the art in adapting the invention to various uses.

What I claim is:

1. An overload release mechanism comprising a driving member and a driven member having a plurality of unevenly spaced alined notches, rolls adapted to lie in said notches and when held therein to form the sole driving connection between the members, and yieldable means for holding the rolls simultaneously in the notches, one of said members having lands adjacent its notches and located beyond the surface of the other member so as to support the rolls out of driving position when they are forced out of the notches by the occurrence of an overload 2. An overload release mechanism comprising a driving member and a driven member having concentric annular flanges, a roll support rotatably mounted coaxially with the members, a roll rotatably mounted on a radial axis upon said support, and a spring forcing the support towards said members, the edges of said flanges having alined roll receiving notches and one of said flanges having a land adjacent its notch and located beyond the edge of the other flange.

3. An overload release mechanism comprising a driving member and driven member relatively rotatable and having concentric annular flanges, a shaft supporting said members to which one of said members is secured, a roll support rotatably mounted on the shaft, a plurality of rolls mounted on radial axes upon said member, a spring encircling the shaft, and an adjustable abutment on the shaft against which one end of the spring bears and whereby it may be caused to press the roll support towards said members, the edges of said flanges adjacent the roll support having alined roll receiving notches and one of said flanges having a land adjacent each of its notches and located beyond the edge of the other flange so as to support the rolls out of driving position when they are forced out of the notches by the occurrence of an overload.

4. An overload release mechanism comprising a driving member and a driven member having notches adapted to be brought into alinement, a roll carrier, a roll mounted for rotation upon the carrier and adapted to lie in said notches, said roll when held in said notches forming the sole driving connection between the driving and the driven members, and yieldable means acting on the roll carrier to hold the roll in the notches and adapted to release said roll from both notches when the torque between the driving and the driven members exceeds a predetermined maximum.

5. An overload release mechanism comprising a driving member and a driven member mounted for rotation one adjacent the other upon coincident axes and formed with notches adapted to be brought into alinement, a roll carrier mounted for rotation relative to said members upon an axis coincident with those upon which the members rotate, a roll mounted on the carrier so as to bridge between the notches in said members and thereby to form the sole driving connection between the driving and the driven members, and yieldable means acting on the roll carrier to hold the roll in the notches and adapted to release the roll from both notches when the torque between the driving and the driven members exceeds a predetermined maximum, one of said members having a land adjacent its notch and located beyond the surface of the other member so as to support the roll out of engagement with said other member when the roll is forced out of the notches by the occurrence of an overload.

NORMAN W. LYON.